(12) United States Patent
Qadrud-Din et al.

(10) Patent No.: US 11,409,752 B1
(45) Date of Patent: Aug. 9, 2022

(54) DIMENSIONAL REDUCTION OF COMPLEX VECTORS IN ARTIFICIALLY INTELLIGENT SOLUTIONS TO COMPARE SIMILARITY OF NATURAL LANGUAGE TEXT

(71) Applicant: Casetext, Inc., San Francisco, CA (US)

(72) Inventors: Javed Qadrud-Din, Foster City, CA (US); Ryan Walker, Lancaster, PA (US); Ravi Soni, San Mateo, CA (US); Marcin Gajek, Berkeley, CA (US); Gabriel Pack, Napa, CA (US); Akhil Rangaraj, San Francisco, CA (US)

(73) Assignee: Casetext, Inc., San Francisco, CA (US)

( * ) Notice: Subject to any disclaimer, the term of this patent is extended or adjusted under 35 U.S.C. 154(b) by 91 days.

(21) Appl. No.: 17/089,658

(22) Filed: Nov. 4, 2020

(51) Int. Cl.
| | |
|---|---|
| *G06F 7/00* | (2006.01) |
| *G06F 16/2457* | (2019.01) |
| *G06N 20/00* | (2019.01) |
| *G06F 40/126* | (2020.01) |
| *G06F 40/279* | (2020.01) |
| *G06F 16/242* | (2019.01) |

(52) U.S. Cl.
CPC ...... *G06F 16/24578* (2019.01); *G06F 16/243* (2019.01); *G06F 40/126* (2020.01); *G06F 40/279* (2020.01); *G06N 20/00* (2019.01)

(58) Field of Classification Search
CPC ............ G06F 16/24578; G06F 16/243; G06F 16/2237; G06F 16/24542; G06F 16/951; G06F 40/126; G06F 40/279; G06F 40/205; G06F 40/30; G06N 20/00
See application file for complete search history.

(56) References Cited

U.S. PATENT DOCUMENTS

| | | | |
|---|---|---|---|
| 10,872,601 B1 * | 12/2020 | Acharya | ............... G06F 40/295 |
| 10,977,250 B1 * | 4/2021 | Lesner | ................ G06F 16/2237 |
| 2020/0226288 A1 * | 7/2020 | Zhang | .................. G06F 40/295 |

* cited by examiner

*Primary Examiner* — Mohammad A Sana
(74) *Attorney, Agent, or Firm* — Maynard Cooper & Gale, P.C.; Jon E. Holland, Esq.

(57) ABSTRACT

A web-based tool performs records matching in response to a freeform text input, to find highly contextually-related sentences in a corpus of records. Each sentence in the corpus is converted into a full-size vector representation, and each vector's angle within space is measured. Each full-size vector is compressed to a smaller vector and a loss function is used to preserve for each vector the angle within the lower-dimensional space that existed for the higher-dimensional vector. Full-size and reduced vector representations are generated from the freeform text input. The reduced-size vector of the input is compared to those of the corpus of text to identify, in real-time, a set of vector nearest neighbors that includes, with high accuracy, representations of all records in the corpus similar to the input. Full-size vectors for the nearest neighbors are in turn retrieved and compared to the input, and ranked results are generated.

15 Claims, 6 Drawing Sheets

DIMENSIONAL REDUCTION OF COMPLEX VECTORS IN ARTIFICIALLY INTELLIGENT SOLUTIONS TO COMPARE SIMILARITY OF NATURAL LANGUAGE TEXT

BACKGROUND

Modern computational systems often rely upon solutions that perform record matching based on user-input values. Record matching is an essential process in a variety of endeavors needed for business and scholarly purposes, including web-based and records-based searches. In conventional solutions using natural language processing for record matching, a query may be compared against a set of existing documents to find similarities, e.g., in the number of occurrences of a common word. However, as the size of document repositories increase, and as artificially intelligent solutions allow for the capture of an increasing number of complex features indicating similarity or relevance, the computational requirements for record matching may become increasingly burdensome.

As one example, electronic research systems may provide resources that allow a user to directly access referenced documents, such as such as journals, articles, cases, case studies, and other related information. Repositories storing such documents may include thousands, millions, or billions of documents. A user may wish to access an interface (e.g., a web-based tool or application) that allows for freeform search against these documents. Conventional systems are limited in practicality based on restrictions of RAM and other computational resources, and cannot in practicality compare a user query to billions of records in real-time.

Technical solutions for more efficient records matching are therefore generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The methods and systems described herein may be used to take in as input a freeform character string (natural language text) and to analyze a corpus of text to identify textual portions that are highly similar to the input string. In some embodiments, a pre-trained model capable of generating vector representations of words or textual passages may generate a series of vectors, each corresponding to a sentence or another measurement of text in a respective passage. In some embodiments, a set of vectors may be combined to be representative of a document as a whole. In some embodiments, every sentence in a corpus of text is vectorized, which, based on the size of the corpus, may comprise millions or billions of vectors. Because such a collection of vectors is, in practicality, too large to store in RAM for purposes of real-time analysis and record matching, the set of vectors may be stored on hard disk or other permanent storage.

In some embodiments, to allow for the efficient consideration of the vectorized sentences in RAM, the dimensionality of the stored vectors is reduced. Further, to allow for high-reliability of the reduction, the vectors are reduced in a manner that preserves the orientation of the vector vis-à-vis other vectors in the vector space, using a modified autoencoder (also referred to herein as a "cosine autoencoder" or simply as an exemplary "autoencoder" for ease of reference). In an embodiment, to maintain the orientation of the vector, the system alters the amount of detail encoded in the vector representation of the freeform text. A sentence is converted into a high-dimensionality vector representation, and a measurement of the vector's angle within the dimensional space is measured. Each high-dimensionality vector (e.g., a 768-dimensional vector) is compressed to a smaller vector (e.g., a 77-dimensional vector) and a loss function is used to preserve for each vector within the lower dimensional space the same angle of orientation that existed for the higher dimensional representation. The dimensionally-reduced vectors (each including its preserved orientation information) may then be stored in RAM to act as a point of comparison in a record matching operation.

In an embodiment, a user accessing a website or other user interface may input a character string (e.g., as freeform text) with the intent of retrieving documents or excerpts from the corpus of text that contain sentences with high similarity to the input string. The input character string is transmitted (in some embodiments, the string being tokenized, and in others, not being tokenized) from a user device to a web server, and then to a textual similarity determination system that has access to the stored set of dimensionally-reduced vectors and a stored set of corresponding full-size vectors (stored on disk). The textual similarity determination system converts the input string to a high dimensionality (full-size) vector, e.g., a 768-dimensionality vector, and, using the same cosine autoencoder used with the larger corpus of text, reduces the dimensionality of the vector to smaller vector, e.g., a 77-dimension vector, corresponding to the input string. Both the full-size vector and the smaller vector corresponding to the input character string are stored in RAM.

In an embodiment, the dimensionally-reduced vectors corresponding to the entire corpus of text may be compared to the dimensionally-reduced vector corresponding to the input string. Cosine similarity (or a similar distance metric) may be used to determine a mathematical measurement of similarity between the vector(s) representing the freeform text input and the reduced vectors representing each sentence in the corpus (or a subset of sentences obtained by applying one or more filters to the corpus). A number of K nearest neighbors to the reduced size vector corresponding to the input character string are identified, ranked based on similarity, and stored. These K nearest neighbors may be understood to comprise a set of vectors large enough to capture the documents with the highest similarity to the input string, that is, the documents of greatest interest, similarity, or relevance to the user, even where other results may be captured. The size of the set of the K nearest neighbors may be predetermined, for example set by a network administrative based on computational resources and/or based on a perceived or measurement reliability or accuracy of the vector encoding process.

In an embodiment, once the set of vectors of interest (K nearest neighbors) has been obtained, the system retrieves from disk the stored full-size vectors corresponding to those nearest neighbor vectors. The retrieved full-size vectors are used in another comparison, that is, cosine similarity values are determined between the full-size vector of the input character string and the retrieved full-size vectors. The most highly-similar results of this comparison (or, in some embodiments, the results that meet a threshold value indicating a high degree of similarity) may be collected. For example, a set number N results with highest similarity may be collected, N being a predetermined number. In some embodiments, the set of collected N vectors is further re-ranked based on a comparison of the original input string to the textual content of the sentence (a character string or content from the record) corresponding to the N vector results. The ranked (or re-ranked) N results may then be displayed or otherwise made available to the user.

In some embodiments, the system is implemented with a web-based interface for searching records, e.g., legal records, scholarly articles, treatises, case law, case records, files, or other textual, metadata, or image or video content. The system may take in a freeform textual input by a user of the web-based interface, and may in response, provide suggested legal content from a corpus of records that are related to the textual input, based on a contextual analysis of the textual input to identify sentences in documents or records related thereto. The suggested related content may be excerpts (e.g., sentences or passages) from or citations to a set of related documents that, based on their similarity to the text input, are likely to have content sufficiently analogous so as to be, e.g., discussed, reviewed, and/or cited by the user. In some embodiments, a document containing a sufficiently similar passage/sentence to that of the freeform text input may be added to a collection of related documents. The collected related content may then be presented or displayed to the user via a user interface as suggested responsive or related content. The presentation of the suggested responsive or related content may be based on a holistic analysis of the textual input to identify related documents. The returned suggested content may be excerpts from or citations to the related documents, hyperlinks, entire records, or the like. In some embodiments, this suggested related content may be displayed to the user for their review and/or selection, and text related to the similar passages can be generated and added to a draft document prepared or stored by the user.

In the exemplary embodiment, the related content is not knowingly or specifically targeted by the user's textual input (that is by, e.g., a record number, ISBN number, author, citation, etc.) nor must it contain word-for-word matches with the input text, but is associated with the content contained in the input text in such a way so as to be similar or analogous in meaning or intention. Documents that may be analyzed may be related to any of variety of technical environments, such as legal, financial, scientific, medical, tax, and/or accounting, among others. In other embodiments, the record matching process need not be limited to character string or freeform text comparison, and the corpus need not be limited to textual passages. Rather, it may involve the retrieval of any records comparable by cosine similarity, such as image comparison or video comparison.

Conventional solutions may make available to their users a digital version of a reference treatise on a field of study, where a user still must engage in individual, manual review of the treatises. These conventional treatises may simply provide snippets of text (such as citations or summaries). In a case that an electronic repository provides a search feature, the user must engage in a Boolean search (combining keywords with operators or modifiers) for records, which search requires the user to guess a combination of words broad enough to capture many results but narrow enough to be meaningful. This is often a frustrating, circular process. Further, in conventional solutions that apply automated analysis, the corpus of text is so large as to be impossible or inefficient to reduce to vector representations for purposes of vector comparison; real-time results. The resource restrictions of modern computing systems (e.g., limitations on RAM) therefore do not allow for record matching in real-time against a large corpus, and intelligent web-based searching in real-time, or close to real-time, may similarly be impossible with such conventional methods.

Further still, in conventional solutions that apply neural network technology to search for matching records, a large number of false positive hits may occur. That is, in some conventional implementations, vectors may be dimensionally reduced through compression, compared, and then reproduced to their full-size. However, conventionally, such solutions optimize for building the reduced vector (optimized for speed or resource management), and sacrifice important data from the original to do so. For instance, in conventional solutions, a dimensionally-reduced vector does not maintain or store its original orientation within the vector space; such orientation may be modified or may be absent in the reduced vector. Because of this, in a cosine similarity function, where the angle between a query vector and another vector is compared in space, vectors with lost or modified orientation may actually be flagged as similar to vectors with highly different orientation. As a result, accuracy of matching is compromised and many false positives may be present in the record results.

In contrast, the systems and methods described herein provide a thorough snapshot of materials (e.g., sentences from a corpus) that are similar or otherwise applicable to the user's intended goal in real-time analysis. Unlike conventional solutions, the solutions described herein permit a user to search based on natural language processing, using freeform text search instead of being limited to known Boolean or other keyword search functions. This is done by converting natural language into both a high-dimension vector and then low-dimension vector while adding additional loss constraints to encode the original orientation of the full-size vector into its dimensionally-reduced representation in a meaningful way. Because the largest number of comparisons is being performed against reduced-size vectors, the RAM and other computing requirements for search are greatly reduced.

By these means, the present systems turn conventional human-led or manual review of different resources like large compilations of disparate legal case law into a technological workflow that allows a holistic review of document records. The systems and methods described herein improve the speed and efficiency of conventional search solutions, both from a compute perspective and a storage perspective. Further, the solutions herein make possible real-time, highly-accurate semantic-based natural language comparison against large, complex data sets in a manner that is repeatable by a single user or multiple users.

Figure 1:
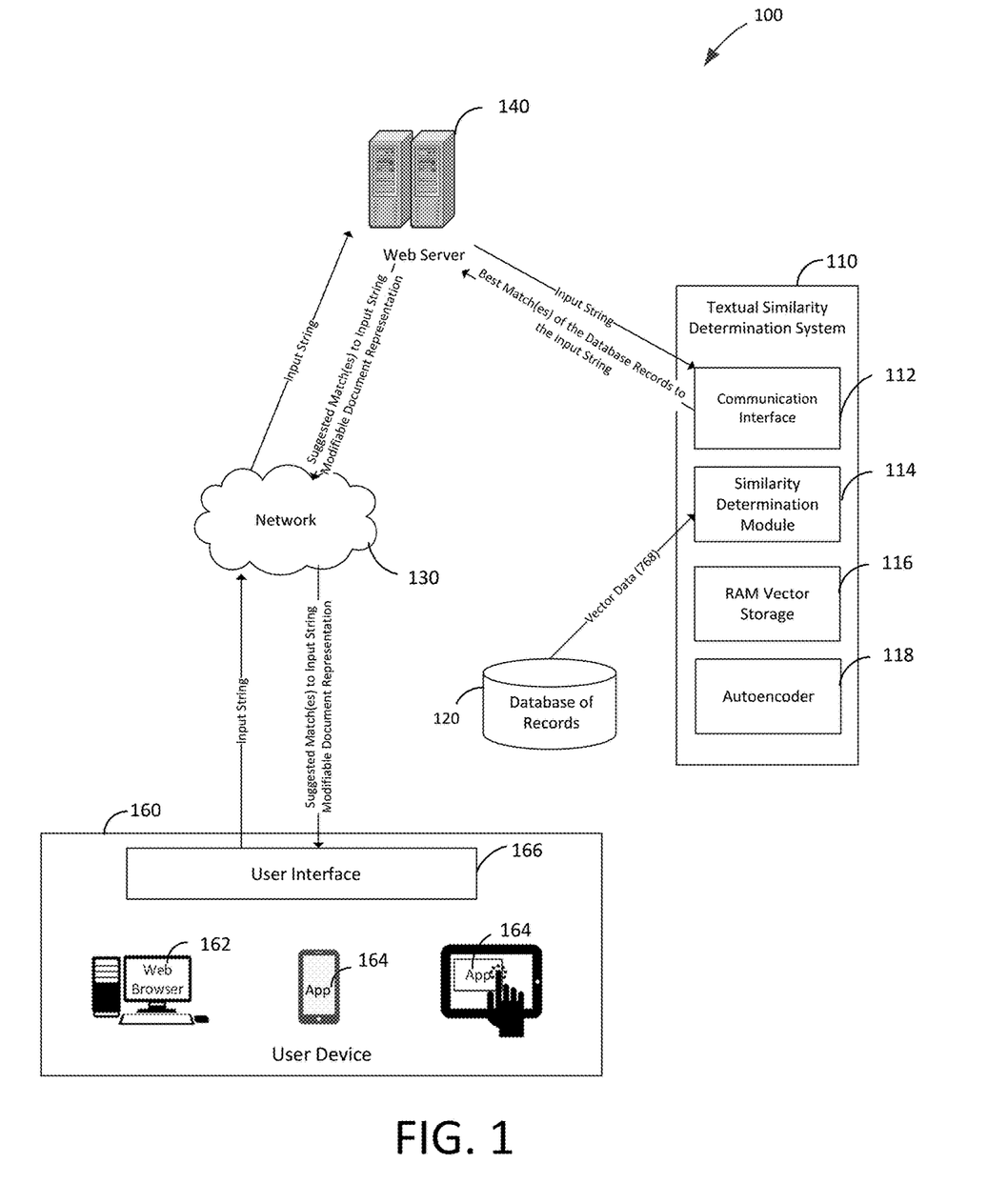
FIG. 1 is a diagram of an environment including a textual similarity determination system with some embodiments of the present disclosure.

FIG. 1 depicts a block diagram of an environment including a textual similarity determination system 110 in accordance with some embodiments of the present disclosure. The components of textual similarity determination system 110 relate to systems, methods, and interfaces for generating particularized content recommendations based on an analysis of similarity to an input query. In the embodiment of FIG. 1, similarity determination module 114 (a component part of textual similarity determination system 110) is managed or facilitated (and in some embodiments owned) by a service provider. The service provider may be generally understood as an individual, entity, or organization that displays or delivers to an end user (a searcher) information and/or user interfaces to allow the user to search electronic research content and select, view, and/or access the resultant content. In an exemplary embodiment, the service provider may be an entity that uses or runs a commercial or non-commercial website, app, or other type of user interface through which users may access document records and other resources related to any technical environment, including but not limited to legal, financial, scientific, medical, tax and/or accounting areas in furtherance of research and/or the preparation of a legal, technical, or otherwise formal document.

In some embodiments, the textual similarity determination system 110 may provide access to an online repository of legal records including, e.g., reference documents such as legal case law, statutes, legal treatises, journal articles, legislative histories, and the like. In some embodiments, the legal records can be variously identified or distinguished by any of (or any combination of): a case or document number, a legal action identifier, the name of an associated judge(s), parties, and/or representatives (attorneys), a filing or initiation date or other important date(s), one or more characteristics reflecting a case outcome, including binary characteristics such as an affirmance/grant or denial, acceptance/non-acceptance, whether associated documents exist (e.g., complaints, evidence, etc.), whether the decision is precedential/non-precedential, whether the decision is published/non-published, or any other appropriate identifier that could be used to filter or select between legal records. Other embodiments are not limited to the accessing of content from legal records repositories, and may instead or additionally access scientific and/or medical records or resources for the purpose of creating documentation, or to any other particular purpose or industry. In still other embodiments, the content is not textual content at all, but is instead image content, video content, sound content, or any other type of content that may be tokenized and/or reduced to a relatively accurate vector representation for purposes of cosine similarity analysis. Textual similarity determination system 110 may also include one or more RAM storage that may be used to store vector representations of text (RAM vector storage 116) and one or more autoencoders 118, which components will be described in greater detail herein.

As shown in FIG. 1, the similarity determination module 114 may be implemented by a textual similarity determination system 110 or other type of device or system that is connected to a network 130 via at least one communication interface 112. Additionally connected to network 130 is at least one web server 140 (which in some embodiments may be part of a system that also houses or is integral with the textual similarity determination system 110). In some embodiments, the textual similarity determination system 110 and the web server 140 are owned and/or operated by the same entity. In an exemplary embodiment, the web server 140 is connected to the same internal network as the textual similarity determination system 110, such that information on the web server 140 may be understood as information "internal" to textual similarity determination system 110. In other embodiments, the web server 140 may be any computer system from which textual similarity determination system 110 may pull information, including, e.g., document data entered by an end user. In some embodiments, textual similarity determination system 110 may collect such information from web server 140 via network 130.

In some embodiments, textual similarity determination system 110 may also be communicatively coupled to (or may otherwise access) a database of records 120 via communication interface 112. In some embodiments, database of records 120 may be external or otherwise limited in access, that is, textual similarity determination system 110 may need to authenticate or otherwise use one or more secured and/or unsecured networks to access database 120. In alternate embodiments, database of records 120 may be part of textual similarity determination system 110 or owned or managed by the same entity.

Network 130 may comprise one or more network types, such as a wide area network (such as the Internet), a local area network (such as an intranet), a terrestrial microwave, or satellite links network, a LAN, a WAN, a cellular network (e.g., LTE, HSPA, 3G, and other cellular technologies) or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network 130 may be the Internet and information may be communicated between system components in an encrypted format such as by a transport layer security (TLS) or secure socket layer (SSL) protocol. In addition, when the network 130 is the Internet, the components of the environment 100 may use the transmission control protocol/Internet protocol (TCP/IP) for communication. In embodiments where any of textual similarity determination system 110, web server 140, and/or database 120 are owned or managed by the same entity, system 110, server 140, and/or database 120 may be connected through one or more networks internal to the entity's system, and in other embodiments they may be connected via network 130 (not specifically shown), where network 130 may be, in such embodiments, the Internet or any other publicly accessible network.

As shown in FIG. 1, web server 140 is communicably accessible to users who may wish to use the system to view records and/or generate document content. For instance, web server 140 may receive query data and/or input data from and transmit data to one or more user devices, referred to herein individually or collectively as user device(s) 160. A user device 160 may be used by individuals or entities to access, view, and/or take action in response to content delivered to the user from the web server 140. A user device 160 may be implemented by one or more computing devices, such as a smartphone or other handheld device (e.g., a tablet or reader), desktop computer, laptop computer, touchscreen device, or any other appropriate device capable of receiving, processing, and outputting digital information via network 130. While FIG. 1 illustrates only one user device 160 and one web server 140, it may be understood that any number of users, any number of servers, and/or any number of databases may be variously configured in different embodiments.

In an exemplary embodiment, the user device 160 presents information to a user via an electronic display on or connected to the device 160, and takes input from the user in relation thereto (for example, through interactive graphics or hyperlinks) via a touchscreen, mouse, keyboard, stylus, or any other appropriate input device. Each user device 160 may present on the electronic display a user interface 166 through, for instance, a web browser 162 and/or other appropriate application(s) 164, or any other technique that can be used to communicate (receive server-generated data and transmit user-generated and/or device-generated data) with the web server 140 via the network 130. In some embodiments, app 164 may be a mobile application or other software application distinct from a generic web browser, or another program capable of receiving digital content from the web server 140 and delivering such content to the user of the device.

Web server 140 may present different types of data on the user interface 166. For instance, user interface 166 may provide an interface (in some implementations, generated and/or delivered by the web server 140), through which a user can view and/or otherwise access the content of one or more documents, and through interaction with the user interface, can input, create, edit, revise, and/or delete content, such actions effecting changes displayed to the user in real time via the interface. While FIG. 1 illustrates a one-to-one correspondence between a user device and one of a web browser 162 or app 164, the embodiments are not so limited. The digital content transmitted to the user devices 160 from web server 140 may include e.g., textual content data, formatted webpages/user interfaces, hyperlinks, images, notifications, suggestions, and/or modifiable document representations.

In some embodiments, web server 140 transmits to the user device 160 a user interface that can take in a freeform textual input by the user. In other embodiments, the user may enter a structured input for search, or may input any combination of freeform/structured input. Textual similarity determination system 110 may function to, in response to receiving this information, retrieve or pull, from a corpus of records stored in one or more databases within or communicably accessible to the system 110 (e.g., database 120), a set of suggested records that contain sentences that most conform most closely to the user's input. These records may be documents, such as legal case law, related articles or research, or the like (though they may be generally referred to herein as "legal records", "document records", or simply "records" in explanation of the various exemplary embodiments), with sentences/passages that may be factually or circumstantially analogous to the provided input. The web server 140 may deliver to the device 160 an interface allowing for textual and other content from those suggested legal records to be reviewed. The textual content may be an excerpt from the suggested legal record, such as an expressive description or summary thereof (in some embodiments authorized and/or authored by the system 110), and/or all or a portion of the matching sentence, the description or summary, a citation or hyperlink to the record or another web-based location, or the like. The suggested related records may not explicitly contain the words of the user's freeform or structured search, but may be contextually associated with the content of that search, that is, records that contain language similar in concept to what was searched by the user are obtained and compiled, in a presentation that may promote valuable content-related insights by the user without requiring the user to exactly predict and duplicate such content in their search.

Figure 2:
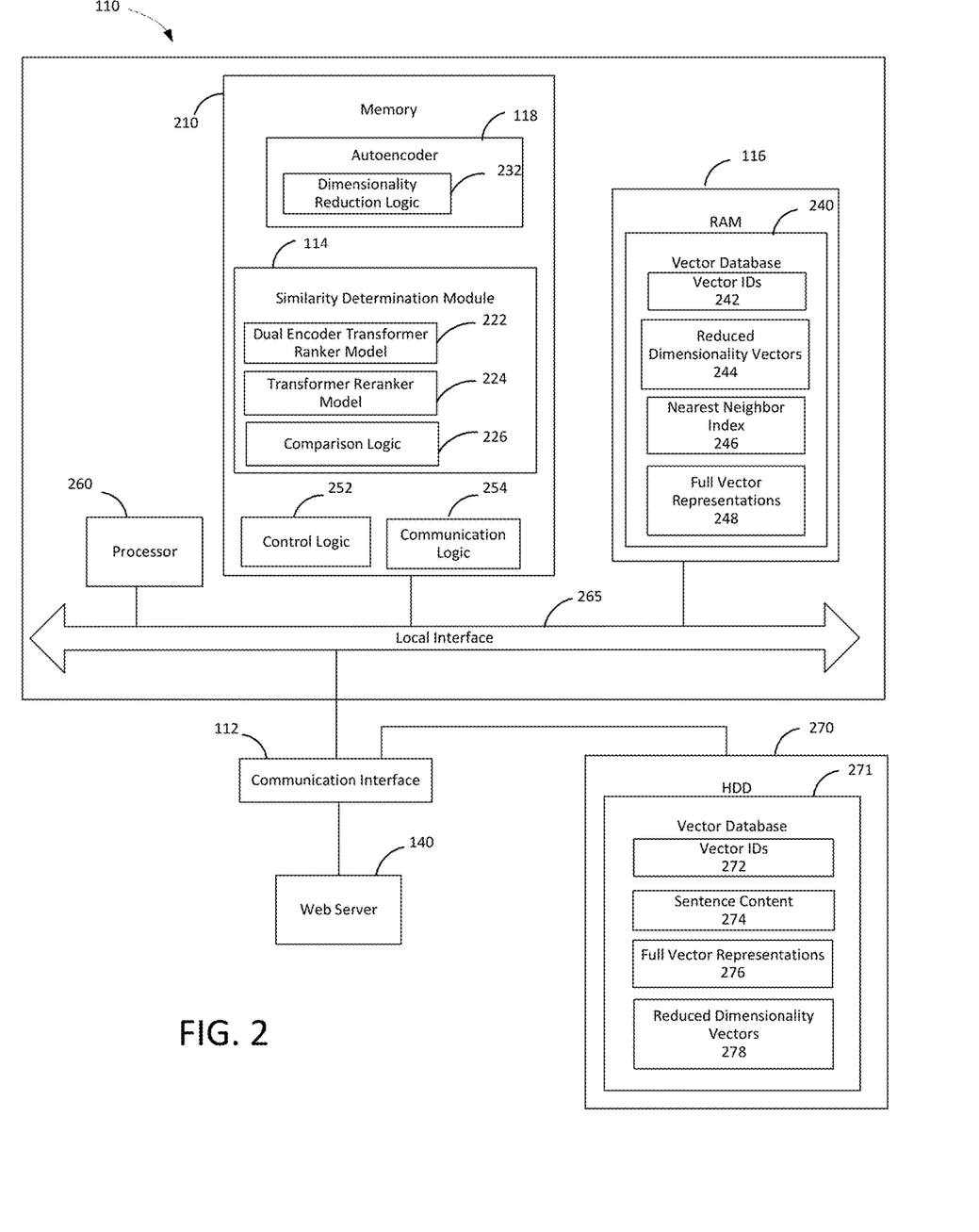
FIG. 2 is a block diagram of select component parts of a textual similarity determination system in accordance with some embodiments of the present disclosure.

FIG. 2 depicts an example schematic diagram of certain components of textual similarity determination system 110 in accordance with some embodiments of the present disclosure. The textual similarity determination system 110 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium) that stores information that is accessible by a processor. Memory 210 may store instructions and data used in the systems and methods described herein. Textual similarity determination system 110 may also include a RAM 116 (or other volatile or other memory accessible by a CPU/processor). In addition, system 110 may access, for example via communication interface 112, a hard disk drive (HDD) 270 or other permanent storage. In some embodiments, HDD 270 may be equivalent to, or stored in the same location as, database 120 (FIG. 1). While FIG. 2 illustrates discrete components corresponding to memory 210, RAM 116, and HDD 270, it will be understood that the embodiments described herein are not limited to any particular arrangement and that other embodiments may store information in one combined memory, in one or more memories, some local to the other components illustrated in FIG. 2 and/or some shared with, or geographically located near, other remote computing systems.

The illustrated embodiment depicts a number of modules stored in memory 210, specifically, similarity determination module 114 (including dual encoder transformer ranker model 222, transformer reranker model 224, and comparison logic 226), autoencoder 118 (including dimensionality reduction logic 232), control logic 252, and communication logic 254. These depicted modules or logics may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of their respective logic. These modules are depicted in FIG. 2 as several discrete components, each labelled as an individual "logic" or "module", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

The system 110 may include control logic 252, including one or more algorithms or models for generally controlling the operation of the system 110. The memory 210 may also, in one embodiment, include communication logic 254, including one or more algorithms or models for obtaining information from or communicating information with web server 140, database 120 (or other external or third party databases), and/or via network 130 (FIG. 1). The similarity determination module 114 may, via communication interface 112, operate to exchange data with various components and/or devices on the network 130 or any other network. For instance, communication interface 112 and communication logic 254 may be used (by, e.g., dual encoder transformer ranker model 222, transformer reranker model 224, and comparison logic 226 in the manner(s) described in greater detail below), to access data from web server 140. In some embodiments, communication logic 254 may use application programming interfaces (APIs) provided by web server 140 to obtain stored data, however, other methods of data collection may alternatively be used such as one or more software development kits, which may include, e.g., APIs, web APIs, tools to communicate with embedded systems, or any other appropriate implementation.

While communication logic 254 is illustrated as being a separate logical component, in an alternative embodiment, the system 110 may include communication logic 254 as part of dual encoder transformer ranker model 222, transformer reranker model 224, comparison logic 226, dimensionality reduction logic 232, or control logic 252. In another alternative embodiment, the communication logic 254 may communicate with third-party systems and/or may coordinate with the control logic 252 to read or write data to memory 210, RAM 116, HDD 270, or to another data repository (not shown) within or accessible to the system 110.

In some embodiments, system 110 may be implemented in whole or in part as a machine learning system (e.g., neural network software) for achieving the functionalities described herein. In one embodiment, one or more of similarity determination module 114 (including dual encoder transformer ranker model 222, transformer reranker model 224, and comparison logic 226), or autoencoder 118 (including dimensionality reduction logic 232) (or any subset of any of those logics) may be implemented at least in part as one or more machine learning algorithms. For instance, autoencoder 118 may be understood as a type of artificial neural network used to produce encodings (e.g., vectors) representative of features in a set of data in an unsupervised manner. In general, autoencoder 118 may include one or more machine learning models for dimensionality reduction and one or more machine learning models for reconstructing (generate a representation close to the original from the reduced encoding).

While, in the exemplary embodiment, each of similarity determination module 114, dual encoder transformer ranker model 222, transformer reranker model 224, comparison logic 226, autoencoder 118, dimensionality reduction logic 232, control logic 252, and communication logic 254 is depicted as part of textual similarity determination system 110, these logical components need not be so configured, and in other embodiments, other configurations of the various components, within system 110 or distributed over one or more computing systems, are possible. Similarity determination module 114, dual encoder transformer ranker model 222, transformer reranker model 224, comparison logic 226, autoencoder 118, dimensionality reduction logic 232, control logic 252, and communication logic 254 may be variously implemented in software, hardware, firmware or any combination thereof. In the exemplary system 110 shown in FIG. 2, these logics are implemented in software and are stored in memory 210. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the exemplary textual similarity determination system 110 depicted in FIG. 2 may be executed by one or more processors 260, such as one or more central processing units (CPU), digital signal processors (DSP), graphics processing units (GPU), application-specific integrated circuits (ASICs), field-programmable gate arrays (FPGAs), and/or microprocessors programmed with software or firmware, other specialized processor or combination of processors, or other circuitry that communicates to and drives the other elements within the similarity determination module 114 via a local interface 265, which can include at least one bus, such as 120, SPI, USB, UART, or GPIO. As an example, the processor 260 may execute instructions of software stored in memory 210, or subsets thereof. While FIG. 2 illustrates one processor 260 which implements all of the various logics in the system 110, it is possible in other embodiments for the system to employ multiple processors. In one such alternate embodiment, discrete processing elements may be used for each of (or any subset of) dual encoder transformer ranker model 222, transformer reranker model 224, comparison logic 226, dimensionality reduction logic 232, control logic 252, and communication logic 254, or any portions or subsets of those logics. In some embodiments, the processing of system 110 is not limited to being performed by a processing element connected to the local interface 265, but instead, any portion of processing in support of the various logics or models may be distributed over one or more computer systems that may be remotely located. For instance, system 110 may include physical computing devices residing at a particular location or may be deployed, wholly or partially, in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In some embodiments, the processor 260 may comprise an artificial neural network or other type of configuration for performing machine learning functions based on instructions stored in memory 210.

The logics stored in memory 210 may be configured, in some embodiments, to access information stored in a vector database 240 in RAM 116 as one or more of vector ID data 242, reduced dimensionality vectors data 244, nearest neighbor index data 246, and/or full vector representations data 248, wherein the respective data 242, 244, 246, 248 for a given vector (representative of a sentence of a record in a corpus) is stored in association with each other. Further, logics stored in memory 210 may be configured to access information stored in a vector database in HDD 270 as one or more of vector ID data 272, sentence content data 274, full vector representations data 276, and/or reduced dimensionality vectors data 278, wherein the respective data 272, 274, 276, 278 for a given vector is stored in association with each other. In some embodiments, the memory 210 may be understood to include one or both of the vector database 240 on RAM 116 or vector database 271 on HDD 270, and in others (as illustrated) any or all of these components and/or data need not be stored on memory 210, but may instead be stored in a different memory and database, whether local to system 110 or on one or more remote servers (in some embodiments, in the cloud). The data in databases 240 and 271 may be accessed and used in a manner discussed in greater detail below and with reference to FIG. 3.

Information in the vector databases 240 and 271 may include information sufficient to uniquely identify a vector representing a sentence from a corpus of records (such as a vector ID), the text of the sentence (or other passage or portion of the vector where appropriate), and one or more associated vector representations. In an embodiment relating to legal records, the information in the vector databases may also include one or more information about the jurisdiction of the legal record (e.g., a court that issued a decision), any other records cited by the record, and/or an outcome value representative or how the court that set the legal standard decided (e.g., in favor of While the term "database" or "repository" is used with reference to elements 210, 120, 116, 240, 270, and 271 these components are not so limited nor is any particular form or configuration of data storage mandated, and the described "databases" may alternatively be one or more of an indexed table, a keyed mapping, or any other appropriate data structure, or any combination thereof.

Figure 3:
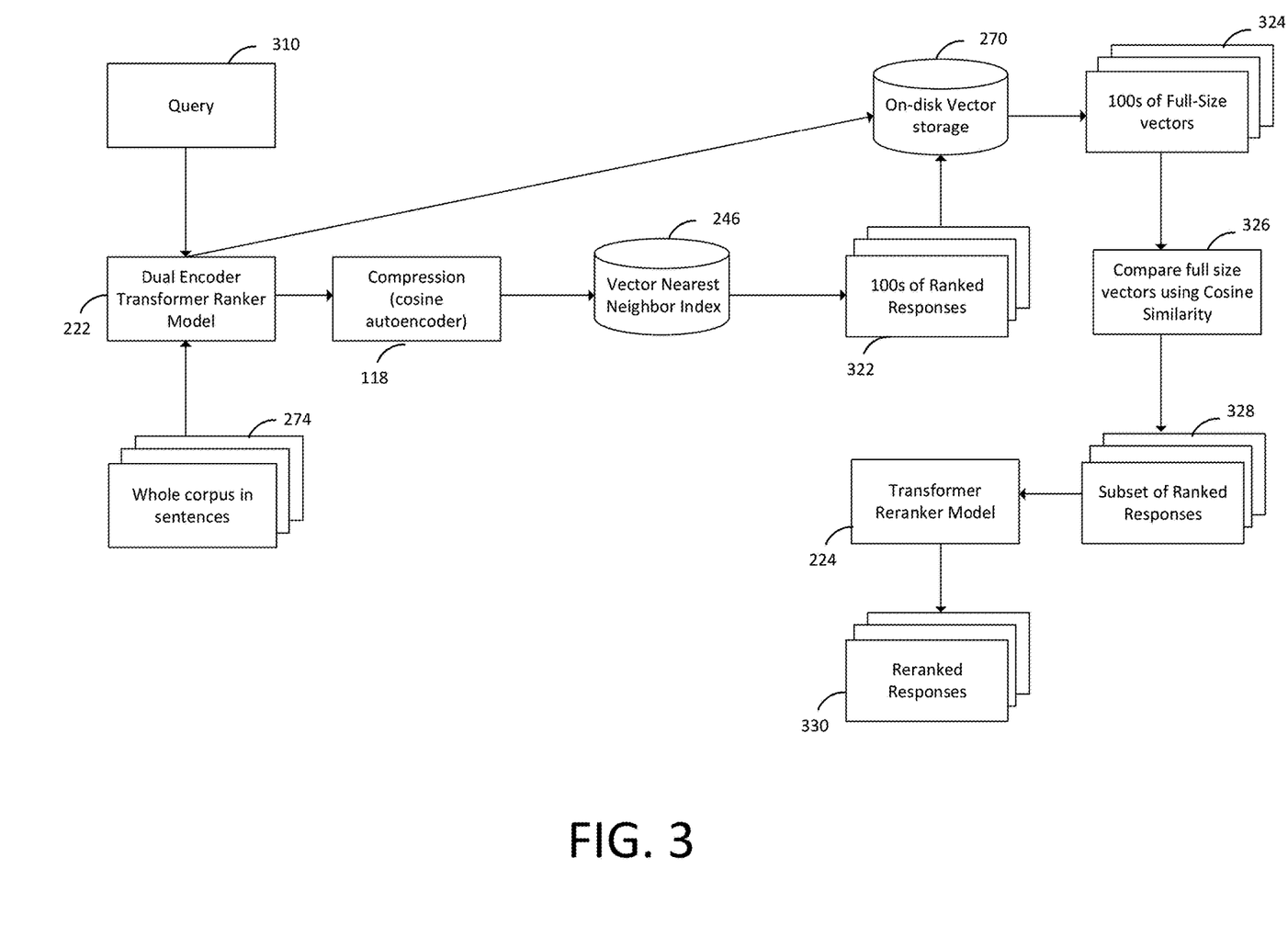
FIG. 3 is an exemplary schematic representation of various system components executing a similarity determination process in accordance with some embodiments of the present disclosure.

FIG. 3 depicts an exemplary record matching process performed by the similarity determination module 114 and the autoencoder 118, sometimes in combination with other components of textual similarity determination system 110 in accordance with some embodiments of the present disclosure. Textual similarity determination system 110 may be understood in this example as a records matching system for retrieving text-based documents with high semantic similarity (related content) to an input character string or query. The related content is found from within a larger corpus or collection of documentary records, based on a holistic analysis of the user's textual input in the query. The returned suggested content may be sentences or excerpts from or citations to the related records, the vector IDs, generated summary or descriptive material, or other information as appropriate, or any combination thereof. The content of the related documents may not necessarily be directly referenced by or overlap with the literal words in the user's freeform textual input, but the content contained in a related document can be understood to be contextually related such that valuable content-related insights can be assembled. This is accomplished through the application of the group of software (variously executed by similarity determination module 114 and the autoencoder 118) functioning together in the comparison of the user's freeform text input to the content of each related document in the corpus of potential documents. Rather than a simple filtering of data based on Boolean search, the process performed by similarity determination module 114 and the autoencoder 118 is a permissive referencing for similar contextual structure in different sentences and different records.

As depicted in FIG. 3, dual encoder transformer ranker model 222 is capable of generating a series of vector representations from and representing textual sentences. A corpus of text is stored, as individual sentences, at the hard disk 270 as sentence content 274. In an exemplary embodiment, dual encoder transformer ranker model 222 vectorizes every sentence in the data 274. The vector representations are then stored on the hard disk 270 as full vector representations 276 (on-disk vector storage), each vector being stored in association with its associated sentence content 274 (the sentence text) and with a unique vector ID 272. In an exemplary embodiment, a "full" size vector may be a 768-dimensional vector, however, other embodiments may use different dimensionalities (for example, 1024 floats or otherwise arbitrary in size), so long as the chosen size is sufficient to capture the richness of the unit of text (e.g., sentence) of the corpus.

The specific method of generating the full-size vector from the textual input may be performed through any of a variety of known methods. In one exemplary embodiment, Google's BERT (Bidirectional Encoder Representations from Transformers) model may be used as an applied natural language processing (NLP) model, however in other embodiments, any other appropriate pre-trained model (e.g., Generative Pretrained Transformer (GPT), Text-to-Text Transfer Transformer (T5), ULMFiT, etc.) may be used. Rather than tokenizing the sentences in a textual document (e.g., into words), and/or obtaining weighting averages to obtain a single a single vector to represent a sequence of words, the systems and methods described herein use the dual encoder transformer ranker model 222 to obtain highly accurate vectors representative of a single sentence. More particularly, two copies of an NLP model (e.g., BERT) are used, trained against the same set of data. Each model outputs a full-size (e.g., 768) vector corresponding to its representations of the text given. A cosine distance loss function is then performed between the output vectors representing the sentences generated by each respective model. The loss is used to retrain the two NLP models, such that the models remain copies of each other, with identical weighting. In an exemplary embodiment, the dual-encoder model 222 may be trained on the corpus of records (in one embodiment, a collection of common law) on a periodic or scheduled basis, for instance daily, weekly, monthly or the like, or in real-time, depending on the size of the collection and the frequency of relevant change within that collection, to optimize the weighting applied by the model. In general, the dual-encoder transformer ranker model results in two identical machine learning models that can be applied to discrete portions of the corpus of records, and that will output vector sentence representations ideal for cosine distance comparison. By these means, in a run-time application, fixed-size representations for individual, varied length sentences in a dataset can be pre-computed and later used in subsequent steps, such as measurements of similarity.

The dual-encoder transformer ranker model 222 is applied to generate high-dimensional vector representations for each of the discrete sentences in the corpus 274. Generated vector representations are stored in on-disk vector storage (database at HDD 270). For processor 260 (e.g., a CPU) to access the vector data quickly, that data must be held in RAM rather than disk. However, a large collection of full-size vectors can be prohibitively large to store in RAM. Accordingly, cosine autoencoder 118 is used to compress the high-dimensional vectors into vectors of smaller dimensionality, thereby greatly reducing the necessary RAM storage space. The dimensionality of the vectors is reduced in a manner than preserves the orientation of the vector vis-à-vis other vectors in the vector space. Cosine autoencoder 118 uses the full-size vectors as a basis to create additional representations of the data with reduced dimensions, by ignoring "noise" or unimportant features in the full-size vectors.

Figure 4:
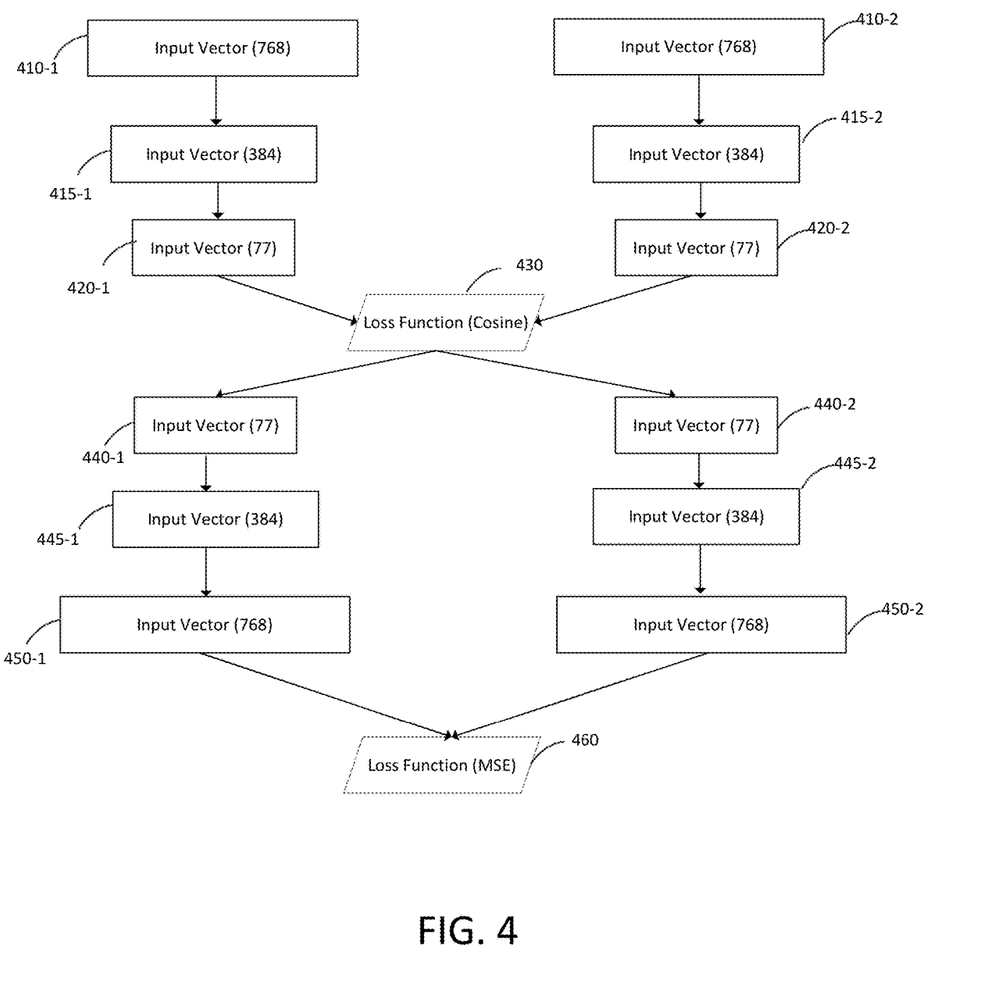
FIG. 4 is an exemplary schematic representation of a vector dimensionality reduction in accordance with some embodiments of the present disclosure.

FIG. 4 illustrates how cosine autoencoder 118 is trained to apply dimensionality reduction logic 232 to obtain reduced-dimension vectors of particular use in a subsequent distance analysis. In an exemplary embodiment, cosine autoencoder 118 alters the amount of detail encoded in a vector representation of freeform text. The cosine autoencoder begins by selecting, for each vector representation 410-1 stored, a second high-dimensional vector representation 410-2 (collectively, vectors 410). In an exemplary embodiment, autoencoder 118 selects a vector close in the corpus (similar in space and therefor context) rather than a randomly selected vector (likely far apart in the space). This ensures a reasonable likelihood that the two input vectors 410-1, 410-2 will be closely related. Other embodiments may exist where the selections alternate or are randomized. Cosine autoencoder 118 next takes a measurement between the two vectors' angles within the high-dimensional space (the cosine distance between the two full-size vectors 410-1 and 410-2 is compared). Through this, the two vectors' relative position within the high-dimensional space is known to the autoencoder, and information regarding that cosine distance is stored in RAM so as to be available for training the cosine autoencoder.

Once the full-size vectors 410-1 and 410-2 have been selected, the autoencoder 118 reduces them down to two, smaller size vectors. In the exemplary embodiment, this is done progressively, first by reducing the two full-size (768-size) vectors to 384-size vectors 415-1 and 415-2 (collectively, vectors 415), and then to 77-size vectors 420-1 and 420-2 (collectively, vectors 420). Each set of two vectors in the corpus (e.g., 768-dimensionality vectors) is thereby compressed to two dimensionally reduced vectors (e.g., a 77-dimensional vector). In this manner, the dimensional reduction may be similar to other learned dimension reduction methods.

However, unlike conventional solutions, once the newly-created 77-dimensional vectors 420-1 and 420-2 are generated, the neural network of the cosine autoencoder 118 further applies an additional constraint to those vectors. This new constraint 430 is a loss function that preserves, in association with the reduced dimensionality vectors 420-1 and 420-2, the same cosine distance as was measured between the two original full-size vectors 410-1 and 410-2 (previously stored). That is, the loss function 430 constrains the smaller vectors 420-1 and 420-2 to a particular orientation where the angle within the lower dimensional space is equal to the angle that existed in the respective higher dimensional representations 410-1 and 410-2 in the higher-dimensional space. The reduced vectors 440-1 and 440-2 to which the additional constraints have been applied (collectively, vectors 440) are stored in RAM in the vector database 240 as reduced dimensionality vector data 244, one vector for each sentence in the corpus. Some embodiments may additionally store the reduced vectors as data 278 in HDD 270. Each reduced dimensionality vector 420 is stored in database 244 in association with at least the same vector ID that is associated with the full-size vector 410 stored in full vector representations data 276 in HDD 270. That is, the system may, beginning with a reduced vector 420, obtain the associated vector ID in database 244, and may use the obtained vector ID to retrieve, from HDD 270, a full size vector representation corresponding to the reduced vector 420, and/or the actual associated sentence content 274.

In the exemplary embodiment, when training the neural network, cosine autoencoder 118 attempts to reconstruct the reduced vectors 440-1 and 440-2, first to 384-size vectors 445-1 and 445-2, and then to the full size (768-size) vectors 450-1 and 450-2. A loss function 460 is applied comparing the components of the reconstructed vectors to the components of the original two vectors, and the outcome of the loss function used to train the cosine autoencoder 118. In an exemplary embodiment, the loss function 460 uses mean squared error (MSE), a commonly used loss function for regression, however other embodiments may use different loss functions as appropriate. In a real-time analysis against a user query 310, the encoder does not need to perform any reconstruction of the vectors 420, and the reduced vectors may be used in a comparison as-is as described further herein.

Turning back to FIG. 3, in an exemplary embodiment, a user accessing a website or other user interface, may input a query 310 (e.g., as freeform text) with the intent of receiving documents or excerpts from the corpus of text having high similarity to the input string. The input query 310 is transmitted from the web server to a textual similarity determination system 110 and processed by the dual encoder transformer ranker model 222. Dual encoder transformer ranker model 222 converts the input string to a full-size vector (768-size) and stores it in RAM 116 (or alternately in another storage in memory 210). In some embodiments dual encoder transformer ranker model 222 may include pre-processing of the text from which the vector is generated, for example a tokenization of the freeform text input 310 into words, punctuation, and the like. In alternate embodiments, such tokenization may be performed at the web server 140 prior to transmission of the query to the system 110. The full-size vector is output from model 222 and sent to cosine autoencoder 118, which may in turn generate and store a reduced dimensionality version of the input query in RAM 116 (or memory 210).

At the time the user enters a query 310, the entire corpus of documents has already been reduced to lower-dimension vectors. In an exemplary embodiment, comparison logic 226 compares the reduced-size vector corresponding to the query 310 to the entire set of reduced-sized vectors stored in reduced dimensionality vector data 244, to act as record results responsive to the query. For example, comparison logic 226 may use a KNN (K nearest neighbor) algorithm using cosine similarity as a distance measurement. The purpose of the comparison is to identify a set of documents of interest, that is, the K nearest neighbors to the reduced size vector corresponding to the query 310, the K nearest neighbors being stored in RAM in a vector nearest neighbor index 246. The number of vectors K is, in the exemplary embodiment, selected or predetermined in advance, based on an analysis of a minimal number of comparisons needed to capture relevant records, or in some embodiments, based on computational and system resources. The set of K nearest neighbors (reduced-dimensionality vectors) may also in some embodiments be stored on disk 270 in the record database as reduced dimensionality vector data 278.

While this disclosure generally discusses cosine similarity (a measurement of the cosine of the angle between two non-zero vectors of an inner product space) as a method to capture similarity between representative vectors (so as to return a number between 0 (orthogonal vectors) and 1 (matching vectors), a higher value indicating a greater degree of similarity, other similarity functions may be used in other embodiments. For instance, Euclidian similarity, Hamming distance, Jaccard distance, Jaro distance, Jaro Winkler distance, Levenstein distance, Smith-Waterman distance and Hellinger distance, or any calculation of similarity or dissimilarity between two values or distributions may be alternately used as appropriate. That is, a similarity measurement such as cosine similarity may be used as the distance metric in a k-NN search to compare documents in the corpus to a given query 310. Comparison logic 226 may also provide a ranking of documents in the corpus based on this analysis, ranked in terms of similarity and/or other measurements of relevance for the user. These ranked responses 322 may number, for example, in the 100s of responses (or any appropriate number), a number far lower than the potential billions of vectors initially created from the corpus.

In some embodiments, the set of reduced-sized vectors stored in reduced dimensionality vector data 244 may be filtered, so as to create a subset of stored data, prior to the comparison of that data to the reduced-size vector corresponding to the query 310. Such filtering may, in some embodiments, be performed by comparison logic 226. This filtering may be most useful in an embodiments where the corpus, as a whole, contains a potentially large number of unrelated documents irrelevant to the user's query, and where filtering may function to reduce the total amount of data to be searched and/or focus in on the user's intention. For instance, where the corpus of text is a set of legal documents or case records, the corpus may be filtered based on a specified set of user inputs (binary or set filters, saved preferences, and the like), may be intelligently filtered based on one or more pieces of information obtained regarding the user (e.g., user location, user search goal, authorization, subscription, etc.) or gathered from the user's device (geographic location, cookies, session, etc.), and/or otherwise based on information known to system 110 about the corpus of records (e.g., a case or document number, a legal action identifier, the name of an associated judge(s), parties, and/or representatives (attorneys), a filing or initiation date or other important date(s), one or more characteristics reflecting a case outcome, including binary characteristics such as an affirmance/grant or denial, acceptance/non-acceptance, whether associated documents exist (e.g., complaints, evidence, etc.), whether the decision is precedential/non-precedential, whether the decision is published/non-published, or any other appropriate identifier that could be used to filter or select between legal records).

The set of ranked responses (reduced-dimensionality vectors) from the K-nearest neighbor search (shown in FIG. 3 as data set 322) may be used to retrieve from disk (from the full vector representations data 276), the full-size vectors corresponding to the set of ranked responses. This may be done, for example, by comparing the plurality of representations to find those associated with the same vector ID 272. The obtained set of full-size vectors (a set of K files, typically numbering in the 100s, a number equivalent to the results of the nearest neighbor search and/or the ranked responses 322) is shown in FIG. 3 as data set 324. In other embodiments, rather than retrieving from disk, the cosine autoencoder may reproduce the original high-dimensional vectors from the lower-dimension version thereof.

In element 326, each of the set of full-size vectors 324 is compared to the full-size vector representation of the query 310 (stored in RAM). In an exemplary embodiment, this comparison at element 326 is performed using cosine similarity, though other methods of determining similarity (as discussed above) may be used in other embodiments. The results of the cosine similarity analysis that meet a threshold value indicating a high degree of similarity may be collected as a subset of ranked responses 328. In other embodiments, a threshold value is not used, but rather the results (for example, the top 20 results or other collection) that are most similar are used. The number of results returned may correspond to any predetermined value, for example set by a network or system administrator based on computational limitations, set by user preference at the time of query, or stored in association with the user's profile data.

In some embodiments, the subset of ranked responses 328 may be re-ranked or reorganized by transformer re-ranker model 224. This re-ranking may be done, for instance, in accordance with one or more specified user preferences. The transformer re-ranker model is, in the exemplary embodiment, a machine learning model (for example a neural network, e.g., a transformer) that compares the actual text of the query (rather than the vector created therefrom) to the text of each of the ranked responses 328, that is to the sentence content 274 stored in association with the respective full-size vector retrieved from disk storage 271. In performing its text-to-text comparison, the re-ranker model may consider for instance, the recurrence of words, similar words, placement of word within the sequence, other context words present, sentence structure, and the like. The output of transformer re-ranker model 224 is a similarity score, which is used to rank the candidate text values (corresponding to ranked responses 328) from most to least responsive to the user query. In an exemplary embodiment, rather than the full set of vectors retrieved disk, the re-ranker model only compares text for a subset (of a predetermined number) of candidate ranked responses 328.

In some embodiments, the dataset of re-ranked responses 330 may be displayed or otherwise made available to the user via one or more user interfaces. More particularly, similarity determination module 114 outputs a set of record results that are analogous to the user's factual situation (contextually overlapping), even if they do not contain language that is identical or literally overlapping with the language of the freeform input.

Figure 6A:
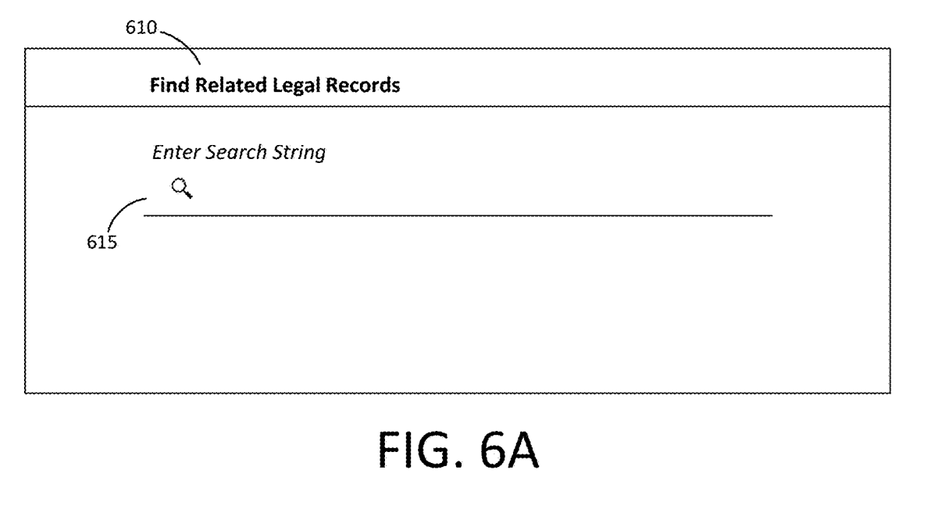
FIG. 6A is an exemplary graphical user interface in accordance with some embodiments of the present disclosure.
Figure 6B:
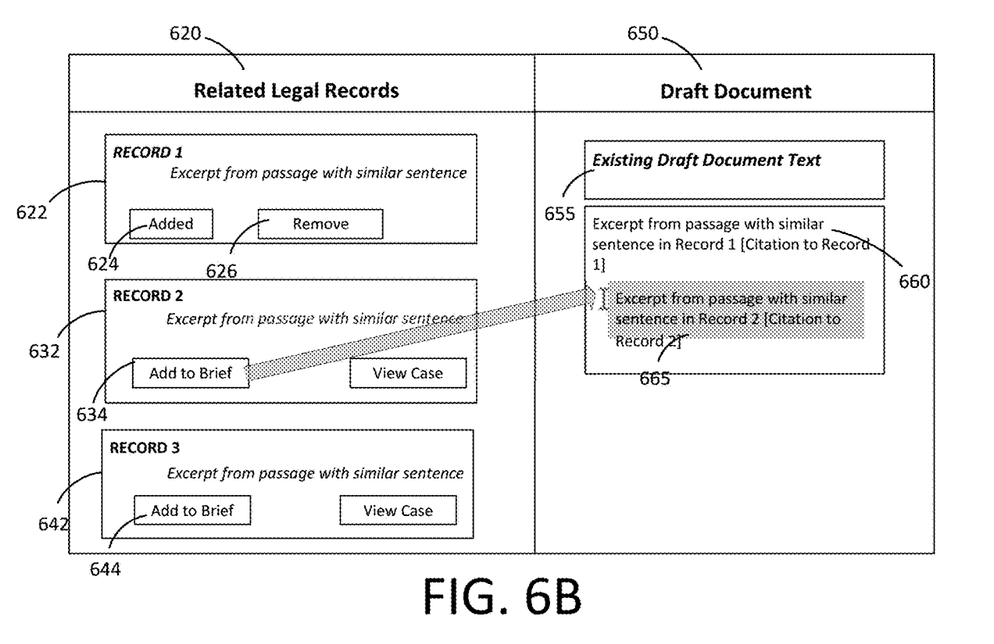
FIG. 6B is an exemplary graphical user interface in accordance with some embodiments of the present disclosure.

In one embodiment, the query 310 described above may take in a freeform textual input by the user, as shown in exemplary user interfaces illustrated in FIGS. 6A and 6B. Although user interface elements may be depicted in a particular arrangement in FIGS. 6A and 6B (and in the respective remaining figures), it will be understood that the components of the various user interfaces may be arranged in any suitable manner in other embodiments and/or may include additional or fewer elements. In an embodiment, control logic 252 and/or communication logic 254 are executed by processor 260 to provide to web server 140 a graphical user interface to be displayed on user device 160. Web server 140 may present to the user device 160 a user interface 166 through which one or more document constraints can be accepted. FIGS. 6A and 6B illustrate exemplary user interfaces, through which a variety of input can be entered by the user of device 160.

In the embodiment of FIG. 6A, the user query is entered into an electronic repository for legal search or legal document drafting, and the record results may be case law results, though other results such as journal articles, treatises, news articles, technical documents, scientific papers and journals, public records (e.g. PACER, ADAMS Public Documents, EDIS, etc.), or any appropriate document may be included in the corpus in other embodiments. For example, one or more user interfaces like FIG. 6A may be presented to the user 160 via web server 140, though any appropriate interface may be used in other embodiments. Through this user interface, freeform text data (natural language data) is collected from a user. Web server 140 (or a component of system 110) may extract, from the input data, various information about the freeform search, including, in an exemplary embodiment, the actual content of the query input string (in some embodiments, in a tokenized format). In addition to the freeform text data entered, the data obtained from web server 140 may also variously include information sufficient to identify the user, such as a user ID (if the user is logged in or otherwise authenticated) or a session ID, as well as the particular text input by the user.

In one embodiment, the user may, in a plain text sentence, phrase, or passage, describe a concept or description connecting the law and the particular facts of the user's case or circumstance. This input may be used by similarity determination module 114 to return one or more records that are contextually related to the content of the freeform search. By these means, the user can find highly relevant content to discuss, compare, and cite to in a document to be/being drafted, without having to identically or explicitly match word-for-word content in such records. By these means, the recommended record search provides a significantly more robust platform to the user to find relevant content than conventional search tools. FIG. 6A illustrates a user interface 610 with a search field 615, though other embodiments may use other configurations or descriptors to take in the user's input. As can be seen, rather than a boolean search or filtered search (e.g., where the user selects keywords, categories, or characteristics), the search field allows for free entry of text in the user's natural language. Once searched, the content entered through field 615 may be converted to a vector representation, processed, and compared to the content of a large collection of potentially related records as described above with reference to query 310 and FIGS. 3 and 4.

FIG. 6B illustrates an exemplary user interface where a set of matching sentences (shown in section 620) has been obtained and is being displayed in response to the user's query, and where such content may be added to a new or in-progress document draft being actively generated by the user in the user interface. Three related legal records 622, 632, and 642, each containing at least once sentence that is similar to the query string 310 are shown on the display (corresponding to the ranked responses of element 330), though there is no limitation on the number or type of sentences/records/content that can be returned or displayed. Each legal record 622, 632, and 642 has a corresponding button 624, 634, and 644 that the user can manipulate (by clicking or taking another action such as a slide, swipe, tap, or the like) to add the related record content to a draft document (shown in section 650 of the user interface). In FIG. 6B, existing content of a document draft is shown as element 655. This may contain saved, formatted draft document content that the user previously selected or created and stored in memory 210. The user may select each record, review both the entirety of its text (View Case), as well as any content that was determined to be similar enough to label the document a "related" record, and, if appropriate, add the similar sentence (or an excerpt from the passage with the similar sentence, or a citation thereto) to the document draft. As can be seen, Record 1 (element 622) has already been added to the document. This information is represented as an excerpt from Record 1 and a citation thereto (element 660) though in other embodiments, rather than a quotation, a summary or paraphrasing may be used, or a citation or hyperlink may be referenced. If the user wishes to add an additional reference to Record 2 (element 632), they may do so by pressing the button 632 ("Add to Brief"), and the related content for such brief may be added to the document draft as element 665. In an exemplary embodiment, the content is added to a location indicated by the user's placement of a cursor inside the document draft.

Figure 5:
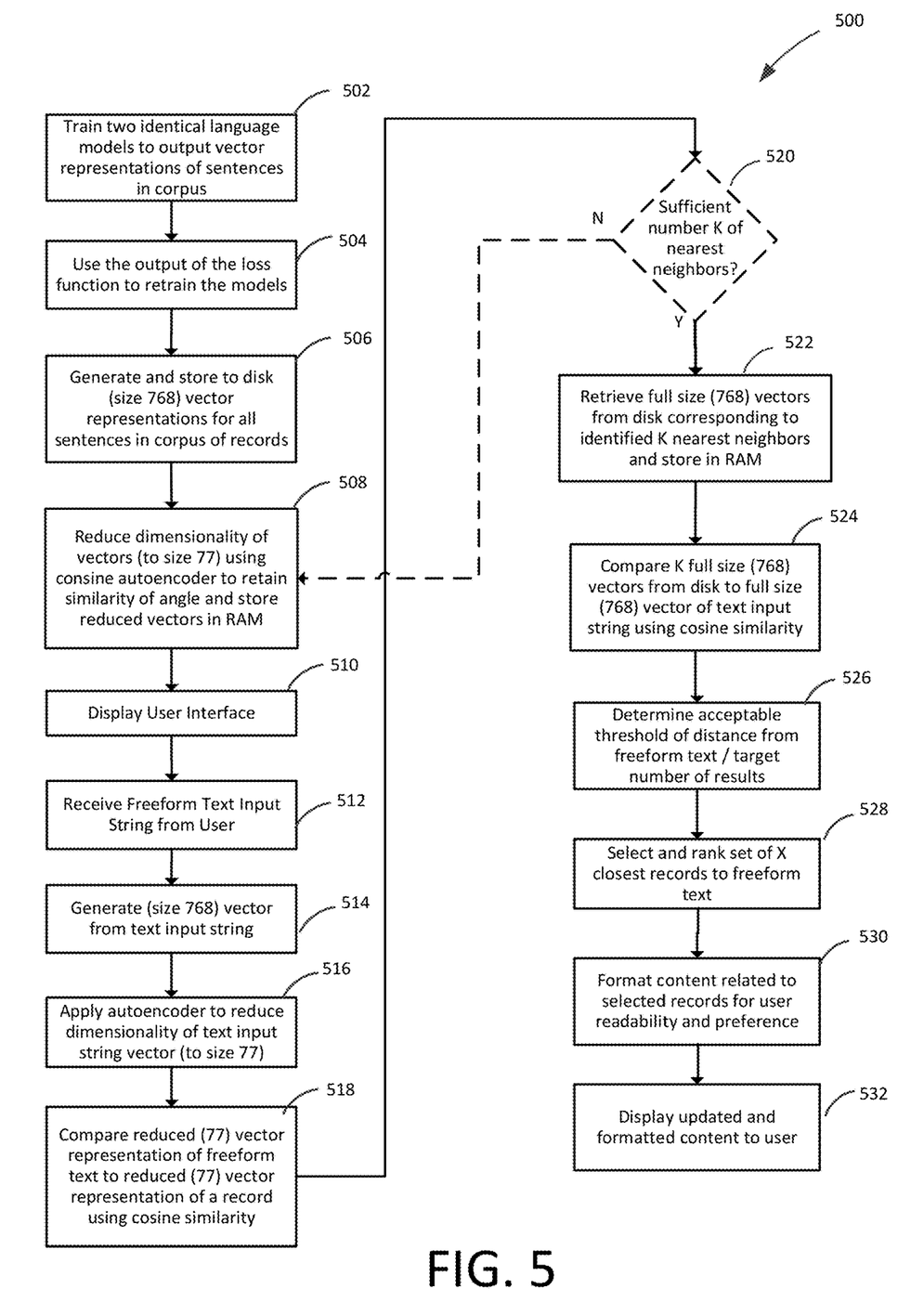
FIG. 5 is an exemplary flowchart of a records matching process in accordance with some embodiments of the present disclosure.

FIG. 5 illustrates an exemplary flowchart of a process 500 of record matching from a corpus of legal records in response to a user input or query. The process begins at Step 502 in which one or more machine learning models have been trained on a set of legal records (for example, the entirety of applicable common law, or a subset thereof, for example, limited by topic or jurisdiction where appropriate, or another set of documents as appropriate). In the embodiment of FIG. 5, two language models have been used, however other embodiments may use only one model, and/or any number or other types of natural language processing models. The outputs of the models are compared and is used to retrain the models (step 504), such as the models are functionality identical, with identical weighting.

In some embodiments, the set of potential legal records may be filtered (not specifically shown), for example based document constraints entered by the user. One or more levels of filtering may be applied in correspondence with standardized user-specified preferences. In the case of the corpus of records including legal records, the filtering may include, e.g., limiting to the jurisdiction of legal records to those within a common jurisdiction of the user, or more senior (viz., appellate) or otherwise informative jurisdictions. In some embodiments, the set of potential records may also be filtered based on other characteristics of the records that may contribute to the persuasiveness or appropriateness of the record, for example, whether the legal record was published or unpublished, or the type of motion or document. Vectors will then be created based on sentences only from the filtered set of records. In still other embodiments, no filter is applied, and the vector creation and comparison will be applied to all available sentences in the entire corpus of documents to provide the broadest pool from which to obtain the set of results for the user.

In step 506, the machine learning models are applied to the entire corpus of text to generate high-dimensional (here, 768-dimensions) vector representations for all sentences in the corpus. A vector may be understood to represent a variety of information about the sentence. This may include any or all of, e.g., semantic characteristics (what the sentence means), the token (words and/or punctuation) in the sentence and what they mean in the context of each other and in the sequence of tokens, and other appropriate contextual information. This data is stored to disk at any location accessible to the system 110 and large enough to accommodate the size of the vector dataset.

Cosine autoencoder 118 is applied in step 508 to the full-size vectors to generate reduced-dimension vector representations (e.g., 77-dimensions), each reduced vector being generated from two full-size vectors. The dataset of reduced-dimension vectors is stored in RAM.

In step 510, a user interface is displayed to a user (e.g., FIG. 6A) and a freeform text input (query) by the user is obtained (step 512). In Step 514, the same model is applied to the input text as to the full text of the each of the records in the corpus of legal records, and a full-size (768) vector representation of the text input is generated. Cosine autoencoder 118 is applied in step 516 to the full-size vector of the text input to generate a reduced dimension vector representation thereof. This vector generation is performed at run-time, that is, in real-time in response to the user query.

In step 518, a kNN algorithm is applied to collect a set of nearest neighbors to the input string, based on a cosine similarity analysis between the reduced vectors of the corpus of records (stored in RAM) and the reduced vector of the input string. By these means, the comparison logic 226 can compare sentence structure, content, word differentiation between the freeform text and the sentences of the possibly related records in records data in RAM 116. The dataset of K nearest neighbors is obtained and stored in an index in RAM. Typically, K is in the hundreds of records, a number much smaller than the entirety of sentences in the corpus.

In some embodiments (optional as indicated by dotted lines), the system 110 may determine whether the identified number of records in the kNN index is sufficiently large so as to capture the entity of records likely to be close in similarity to the input string (step 520). The sufficiency of the K number of results in such a dataset may vary based on circumstances of the document and, if appropriate, the related legal action. In some embodiments, any non-zero set of results may be deemed sufficient. However, in other embodiments, comparison logic 226 contains sufficient intelligence to understand the relative size of the number of similar records against the corpus of records (or filtered set of records, if filtered), and to determine whether the set of results is proportionately small in comparison thereto. If the number is insufficiently low (likely to have missed documents) or in some embodiments too high (likely to contain too many false positives), some implementations may re-generate the vector representations of the stored records, under the assumption that an error was introduced (circle back to step 508), or may remove one or more filters applied. In other embodiments, where the number of neighbors K is an unexpected or unusable value, the system may return to the user, via the user interface, an error message or notification and/or one or more suggestions to refine the input string for search.

In step 522, K full-size vectors corresponding to the vectors stored in the index of nearest neighbors are retrieved from disk and stored in RAM. A cosine similarity determination is performed between each of the respective K full size vectors and the full-size vector (stored in RAM) corresponding to the input string. By these means, comparison logic 226 is capable of determining, in a highly automated and reliable manner, textual similarity between the freeform text input and one or more document records. A document with a sufficiently similar passage/sentence to that of the freeform text input is found where at least one sentence in the text of a record in corpus of records (or the filtered set of records) is determined by a calculation of cosine similarity to be contextually similar to the text obtained from the freeform input in Step 512. The record with high similarity (or a representation thereof) may then be added to a collection or set of related documents. With regard to steps 512-532, performed in real time in response to the user's query, although two comparison steps are occurring against the query string (Steps 518 and 524), the quantity of full-size vectors being compared in real-time is relatively small (K records as compared to potentially billions of records), so the efficiency of search is greatly improved. Further, the process described herein requires that only a number K full-size vectors are maintained in RAM at a given point of comparison, leading to greater flexibility of application in storage and/or resource constrained implementations.

The process continues to Step 526, in which comparison logic 226 calculates an acceptable threshold value of distance measurement between the freeform text and each of the set of K related records, so as to provide the user with a manageable set of similar record results. In some embodiments, this calculation of distance may be based on the number of similar records found (e.g., the system may be more likely to return all or a large portion of a smaller set of results, thereby permitting a greater distance or a greater range of dissimilarity in the results). Once a threshold distance has been determined, a number of records X falling within that distance can be compiled into a set of closest related records. In other embodiments, rather than a threshold value of distance, the top X records of the ranked results are selected as the set of closest related records, X being a predetermined or calculated number. Such closest related records are formatted (step 530) and displayed to the user in Step 532 (e.g. FIG. 6B).

In some embodiments, in step 528, the set of X related content is re-ranked for presentation to the user via the user interface 166, with higher ranked items being ranked above or ahead of lower-ranked items. Relevance (and therefore ranking) of results is defined by conceptual closeness of the actual text of the sentence typed in in the freeform input as compared to the actual text of the sentenced stored in the corpus. That is, the record content (text) of the set of X related vector content is retrieved from disk, and is compared to the text of the input query using one or more machine learning algorithms. Results with greater similarity are ranked (and therefore displayed) higher up or otherwise prioritized in the ranking of related records. In some embodiments, the ranking of records applied in step 528 may consider other types of information, weighting sentence based on information such as document constraint information entered by the user, a number of any cited or co-referenced documents within the record, the record date, the depth of treatment of the topic of interest to the user, or the like.

Alternative embodiments may exist for the cosine autoencoder described above with reference to FIGS. 3-5 that are not limited to natural language comparison, or even to textual comparison. For instance, any application using a cosine distance metric to compare similarity of objects may benefit from the cosine autoencoder's preservation of relative angle measurement. Accordingly, the systems and methods described herein may be generally applied to any use of cosine distance to perform comparison of vector representations, such as comparison of image data, audio data, video data, or any other appropriate deep learning solution using vectors to represent comparative entities In a conventional implementation, every sentence in a corpus of records may be vectorized and stored in memory for purposes of comparison to a query string. Where, for example, the vectorization is high in dimensionality (e.g., 768 or 1024 dimensions) to maintain the richness and complexity of the text, the amount of RAM needed to store the entire dataset of vectors (on the order of billions of sentences) is impracticably large and/or prohibitively expensive. However, by virtue of the systems and methods described herein, an additional loss function is introduced to a vector dimensionality reduction required for search is greatly reduced while maintaining the relative angles of the vectors representing the various sentences. Therefore, a more efficient comparison of reduced-dimensionality representations may be performed with a high degree of accuracy that is unobtainable in conventional solutions. Further, by virtue of the methods and systems described herein, a method of natural language sentence comparison that generate efficient, accurate results based on a user's intended contextual inquiry rather than a purely literal interpretation.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for matching records to a freeform text input, the system comprising:
   a memory storing a plurality of records;
   an interface to receive, from a user, a text input; and
   one or more processors configured to execute instructions in the memory to perform steps comprising:
      training one or more natural language processing (NLP) models on one or more of the plurality of records;
      generating, for each of the plurality of records, a respective high-dimensionality vector representation;
      storing, in the memory, the high-dimensionality vector representation for each of the plurality of records;
      generating, for each of the plurality of records, a reduced-dimensionality vector representation, wherein the generating of a reduced-dimensionality vector representation includes (a) measuring a relative angle between a high-dimensionality vector representation of the respective record of the plurality of records and a selected high-dimensionality vector representation corresponding to another record of the plurality of records, (b) performing a dimensionality reduction of the high-dimensionality vector representation of the respective record of the plurality of records to obtain the reduced-dimensionality vector representation, and (c) applying a loss function to the reduced-dimensionality vector representation that constrains the reduced-dimensionality vector representation to the measured relative angle;
      obtaining, via the interface, the text input;
      generating, for the text input, a high-dimensionality vector representation;
      generating, for the text input, a reduced-dimensionality vector representation;
      comparing the reduced-dimensionality vector representation of the text input to each of the reduced-dimensionality vector representations of the plurality of records to obtain a set of K nearest neighbors to the text input;
      retrieving, from the memory, a subset of K high-dimensionality vector representations corresponding to the obtained K-nearest neighbors;
      determining a measurement of similarity between the high-dimensionality vector representation of the text input and each of the subset of K high-dimensionality vector representations;
      determining, based on the measurement of similarity, a set of highly-similar high-dimensionality vector representations; and
      displaying to the user via the interface, for each of the set of highly-similar high-dimensionality vector representations, a character string representing the record corresponding to the highly-similar high-dimensionality vector representation.

2. The system of claim 1, wherein the selected high-dimensionality vector representations corresponding to the another record of the plurality of records is selected based on the proximity of the another record to the respective record.

3. The system of claim 1, wherein both of a respective high-dimensionality vector representation corresponding to a record and a reduced-dimensionality vector representation corresponding to the record are representative of a single sentence in a corpus of text.

4. The system of claim 1, wherein each of the high-dimensionality vector representations is a 768-dimensional vector, and
   wherein each of the reduced-dimensionality vector representations is a 77-dimensional vector.

5. The system of claim 1, wherein the measurement of similarity between the high-dimensionality vector representation of the text input and each of the subset of K high-dimensionality vector representations is determined based on a cosine similarity determination.

6. The system of claim 1, wherein the displaying to the user via the interface, for each of the highly-similar high-dimensionality vector representations, of a character string representing the record corresponding to the highly-similar high-dimensionality vector representation comprises:
   identifying a set of vector representations, of the set of highly-similar high-dimensionality vector representations;
   obtaining, from the memory, for each of the set of vector representations, record content;
   ranking the obtained record content; and
   transmitting, to the interface, the ranked obtained record content.

7. The system of claim 6, wherein the obtained record content is ranked based on a comparison of the record content to the text input.

8. A method for matching records to an input value, the method comprising:
   generating, for each of a plurality of records, a respective high-dimensionality vector representation;
   storing, in a memory, the high-dimensionality vector representation for each of the plurality of records;
   generating, for each of the plurality of records, a reduced-dimensionality vector representation, wherein the generation of a reduced-dimensionality vector representation includes (a) measuring a relative angle between a high-dimensionality vector representation of the respective record of the plurality of records and a selected high-dimensionality vector representation corresponding to another record of the plurality of records, (b) performing a dimensionality reduction of the high-dimensionality vector representation of the respective record of the plurality of records to obtain the reduced-dimensionality vector representation, and (c) applying a loss function to the reduced-dimensionality vector representation that constrains the reduced-dimensionality vector representation to the measured relative angle;
   storing, in a volatile memory, the reduced-dimensionality vector representation for each of the plurality of records;
   obtaining, via an interface, an input value;
   generating, for the input value, a high-dimensionality vector representation;
   generating, for the input value, a reduced-dimensionality vector representation;
   comparing the reduced-dimensionality vector representation of the input value to each of the reduced-dimensionality vector representations of the plurality of records to obtain a set of reduced-dimensionality vector representations related to the input value;

retrieving, from the memory, a subset of high-dimensionality vector representations corresponding to the obtained set of reduced-dimensionality vector representations related to the input value;

determining a measurement of similarity between the high-dimensionality vector representation of the input value and each of the subset of high-dimensionality vector representations;

determining, based on the measurement of similarity, a set of highly-similar high-dimensionality vector representations; and displaying to the user via the interface, for each of the set of highly-similar high-dimensionality vector representations, a character string representing the record corresponding to the highly-similar high-dimensionality vector representation.

9. The method of claim 8, wherein the selected high-dimensionality vector representation corresponding to the another record of the plurality of records is selected based on the proximity of the another record to the respective record.

10. The method of claim 8, wherein both of a respective high-dimensionality vector representation corresponding to a record and a reduced-dimensionality vector representation corresponding to the record are representative of a single sentence in a corpus of text.

11. The method of claim 8, wherein each of the high-dimensionality vector representations is a 768-dimensional vector, and
wherein each of the reduced-dimensionality vector representations is a 77-dimensional vector.

12. The method of claim 8, wherein the measurement of similarity between the high-dimensionality vector representation of the text input to each of the subset of high-dimensionality vector representations is determined based on a cosine similarity determination.

13. The method of claim 8, wherein the displaying to the user via the interface, for each of the subset of highly-similar high-dimensionality vector representations, of a character string representing the record corresponding to the highly-similar high-dimensionality vector representation comprises:

identifying a set of vector representations, of the set of highly-similar high-dimensionality vector representations;

obtaining, from the memory, for each of the set of vector representations, record content;

ranking the obtained record content; and transmitting, to the interface, the ranked obtained record content.

14. The method of claim 13, wherein the obtained record content is ranked based on a comparison of the record content to the input value.

15. A method for matching records to an input value, the method comprising:

generating, for each of a plurality of records, a respective high-dimensionality vector representation;

measuring a relative angle between a first high-dimensionality vector representation of a first record of the plurality of records and a second high-dimensionality vector representation of a second record of the plurality of records, generating, for each of the plurality of records, a respective reduced-dimensionality vector representation, by: (a) generating a reduced-dimensionality vector representation by performing dimensional reduction on a first high-dimensionality vector representation, and (b) applying a loss function to the reduced-dimensionality vector representation that constrains the first reduced-dimensionality vector representation to the measured relative angle associated with the first high-dimensionality vector representation;

obtaining a freeform text input;

generating, for the freeform text input, a high-dimensionality vector representation;

generating, for the freeform text input, a reduced-dimensionality vector representation;

comparing the reduced-dimensionality vector representation of the freeform text input to the reduced-dimensionality vector representations for each of the plurality of records, so to as to determine a set of reduced-dimensionality vector representations proximate to the freeform text input;

retrieving, from the memory, a set of high-dimensionality vector representations corresponding to the set of reduced-dimensionality vector representations proximate to the freeform text input;

determining a measurement of similarity between the high-dimensionality vector representation of the freeform text input and each of the set of high-dimensionality vector representations; and for each of the set of high-dimensionality vector representations, in a case that the measurement of similarity exceeds a threshold value, transmitting, to a remote server, record content corresponding to the high-dimensionality vector representation.

* * * * *